Patented Apr. 13, 1943

2,316,472

UNITED STATES PATENT OFFICE 2,316,472

MANUFACTURE OF VINYL ESTERS

Karl Heinrich Walter Tuerck, Banstead, England, assignor to The Distillers Company Limited, Edinburgh, Scotland, a British company No Drawing. Application April 5, 1940, Serial No. 328,098. In Great Britain April 18, 1939

1 Claim. (Cl. 260—486)

This invention relates to the manufacture of vinyl crotonate.

The known methods of manufacture of vinyl esters, particularly vinyl acetate, are not industrially satisfactory when applied to the manufacture of vinyl crotonate. One known method is to react the organic acid (e. g. acetic acid) of the desired ester with acetylene at a high temperature in the presence of a mercuric catalyst, using an excess of acetylene to carry off the ester as formed. Another known method is to avoid the use of high working temperatures and to employ for bringing about the reaction of the organic acid with the acetylene selected complex catalysts composed of mercuric sulphate and material formed by the interaction of sulphuric acid with acetic anhydride.

The above-mentioned high temperature method is not practicable for the production of vinyl crotonate because the crotonic acid readily resinifies and the formation of ethylidene dicrotonate is predominant. On the other hand in the case of the low temperature method the degree of conversion with acids higher than acetic is very poor, and the time occupied is long; for example in the case of propionic acid the yield based on acid consumed is only 24 per cent and the time of reaction is 7 hours and still poorer results are to be expected with crotonic acid.

According to the present invention vinyl crotonate is produced in good yield by bringing acetylene into contact with crotonic acid in the presence of a solvent for the acid and at a temperature not exceeding about 50° C. in the presence of a catalyst. In this way the disadvantages of both of the known methods above mentioned are avoided. The reaction is quick, and the main product is vinyl crotonate. As catalysts there may be used those known to cause the formation of vinyl esters by reaction of acetylene on the corresponding acid. The use of a solvent in accordance with the mixture renders it unnecessary to employ the complex catalysts hitherto used in similar reactions. It has been found preferable also to form the catalyst inside the reaction medium itself, that is by adding the components of the catalyst separately to the reaction mixture.

A particularly useful solvent for the crotonic acid used is ethylidene dicrotonate but, if desired, any solvent for crotonic acid which is inert to the reacting medium and which does not affect the stability of the reaction product may be employed. Such solvents include acetone, lower aliphatic alcohols and hydrocarbons having the aforementioned properties.

The vinyl crotonate formed may be separated by distilling it off at reduced pressure and low temperature e. g. at a pressure of 7 to 20 mm. of mercury and a temperature of 30 to 50° C. The residue is unchanged crotonic acid and ethylidene-dicrotonate and can be used for further vinyl crotonate formation. The amount of vinyl crotonate obtainable from a given quantity of crotonic acid is high, being of the order of 65 per cent or more, even up to about 90% and the time of formation is short, being from 1 to 3 hours. The process can be carried out either batchwise or continuously.

It has been found that the use of an excess of free inorganic acids in any form, and the technical difficulties arising therefrom can be avoided. Thus the reaction is successfully carried through, even if, in the case of a mercuric sulphate catalyst, the amount of sulphuric acid employed is not more than about half the quantity required for the formation of the mercuric sulphate.

The following are examples illustrating the manner of carrying the invention into effect.

Example I

To a solution of 86 grms. crotonic acid in ethylidene-dichrotonate, 6.2 grms. HgO are added in the form of a catalyst made by dissolving 6.2 grms. HgO in 8.4 grms. crotonic acid. 0.61 grm. $H_2SO_4$ (98%) are added. The mixture is shaken and kept at 25-30° C. while acetylene is introduced so that it is entirely absorbed. Absorption is entirely finished after three hours. The reaction mixture is fractionated under a reduced pressure of 7-10 mm. of mercury and a temperature of 35-50° C. 72 grms. of vinyl crotonate are obtained corresponding to a conversion of 65.0%.

The residue containing 15.7 grms. crotonic acid and ethylidene dicrotonate is used as a solvent for the next batch. It may, if desired, be filtered off from the mercuric catalyst, but this is not essential.

Example II

To a solution of 112 grammes of crotonic acid in 200 grammes of ethylidene dichrotonate which contained a small amount of free sulphuric acid, 10 grammes of mercuric acetate were added and acetylene gas was passed in at room temperature. 24 grammes of acetylene were absorbed and 79 grammes of vinyl crotonate were obtained by distillation under reduced pressure. It was found that 28.6 grammes of crotonic acid had remained unreacted so that the yield of vinyl crotonate calculated on the crotonic acid consumed was over 70%.

What I claim is:

A process for the production of vinyl crotonate which comprises bringing crotonic acid into solution by dissolving it in an organic solvent, the quantity of which being such as to keep the crotonic acid dissolved during the reaction, adding a mercuric compound and sulphuric acid separately so as to precipitate mercuric sulphate in the reaction mixture and introducing into said mixture, at the rate at which it is absorbed, acetylene while the temperature is maintained below 30° C.

KARL HEINRICH WALTER TUERCK.